(12) United States Patent
Li et al.

(10) Patent No.: US 8,194,428 B2
(45) Date of Patent: Jun. 5, 2012

(54) UNIFIED CONTROL OF SINGLE AND THREE-PHASE POWER CONVERTERS

(75) Inventors: Lihua Li, Irvine, CA (US); Keyue Smedley, Aliso Viejo, CA (US); Taotao Jin, Irvine, CA (US)

(73) Assignee: UCI-The Regents of the University of California, Oakland, CA (US)

( * ) Notice: Subject to any disclaimer, the term of this patent is extended or adjusted under 35 U.S.C. 154(b) by 494 days.

(21) Appl. No.: 12/442,439

(22) PCT Filed: Oct. 4, 2007

(86) PCT No.: PCT/US2007/080477
§ 371 (c)(1),
(2), (4) Date: Mar. 23, 2009

(87) PCT Pub. No.: WO2008/043039
PCT Pub. Date: Apr. 10, 2008

(65) Prior Publication Data
US 2010/0019742 A1      Jan. 28, 2010

(51) Int. Cl.
*H02M 5/42* (2006.01)
*G05F 1/10* (2006.01)

(52) U.S. Cl. .................. 363/89; 363/44; 323/241
(58) Field of Classification Search .............. 363/39, 363/44–48, 87, 89; 323/235, 237, 239, 241
See application file for complete search history.

(56) References Cited

U.S. PATENT DOCUMENTS

| | | | |
|---|---|---|---|
| 4,490,780 A * | 12/1984 | Nondahl | 363/87 |
| 6,297,980 B1 * | 10/2001 | Smedley et al. | 363/89 |
| 6,545,887 B2 * | 4/2003 | Smedley et al. | 363/89 |
| 7,471,529 B2 * | 12/2008 | Jin et al. | 363/87 |

FOREIGN PATENT DOCUMENTS
WO   WO2005/043742 A2   5/2005
* cited by examiner

*Primary Examiner* — Jessica Han
(74) *Attorney, Agent, or Firm* — Dickstein Shapiro LLP; Kenneth S. Roberts

(57) ABSTRACT

Provided herein is are unified control methods and implementations for controlling single and three-phase power converters. In an exemplary embodiment, a unified controller is provided that can be used to control a three-phase three-wire Voltage Source Inverter (VSI), a three-phase four-wire VSI, a three-phase grid-connected power converter for current shaping, and a single-phase full bridge VSI.

16 Claims, 7 Drawing Sheets

UNIFIED CONTROL OF SINGLE AND THREE-PHASE POWER CONVERTERS

FIELD OF THE INVENTION

The present invention relates to control of power converters, and more particularly to unified control of single and three-phase power converters.

BACKGROUND INFORMATION

Various control schemes have been developed to provide voltage regulation and current shaping of single and three-phase power converters. Known controllers include Sinusoidal Pulse Width Modulation (SPWM) and Bang-Bang type controllers. However, the limited dynamic range, high loss/harmonic distortion as well as possible conflict in control of each phase make them less popular than space vector modulation (SVM) based control. As the most popular control method so far, SVM based controllers provide satisfactory performance; however, the inevitable d/q transformation requires high speed DSP and high sampling rate A/D, which excessively increases both the design complexity and cost.

Therefore, there is a need for unified control methods that can be used to control different power converters while providing good performance without the complexity and cost associated with SVM based controllers.

SUMMARY

Provided herein is are unified control methods and implementations for controlling single and three-phase power converters.

In an exemplary embodiment, a unified controller is provided that can be used to control a three-phase three-wire Voltage Source Inverter (VSI), a three-phase four-wire VSI, a three-phase grid-connected power converter for current shaping, and a single-phase full bridge VSI. The unified controller comprises a feed back signal processor, a region selector, a control signal selector, a control core, and a gate signal distributor. Each cycle of the power converter is divided into different active regions that are detected by the region selector based on the zero crossing points of the power converter's AC voltages. The feedback signal processes feedback voltages and/or current signals from the power converter into intermediate signals (e.g., phase voltages). The control signal selector receives the intermediate signals (e.g., phase voltages) from the feedback signal processor and generates control signals by selecting one or more of the intermediate signals (e.g., phase voltages) for each control signal according to the active region detected by the region selector. The control core generates duty-ratio signals based on the control signals from the control signal selector. The gate signal distributor distributes the duty-ratio signals to trigger the appropriate switches in the power converter according to the active region detected by the region selector.

Different exemplary implementations of the feedback signal processor are provided for controlling different power converters. The control signal selector and gate signal distributor can be implemented using logic circuits that select the intermediate signals (e.g., phase voltages) for the control signals and distribute the duty-ratio signals by following a logic table in accordance with the detected active region. Different logic tables can be followed for controlling different power converters. Different exemplary implementations of the control core are also provided including pulse width modulation (PWM) and one cycle controller (OCC) implementations. The exemplary embodiment and implementations above are provided as examples only and not intended to limit the invention.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

DETAILED DESCRIPTION

Described herein is a unified control method and implementations for controlling the following power converters:

1. three-phase four-wire Voltage Source Inverter (VSI) to perform voltage generation,
2. three-phase three-wire VSI to perform voltage generation,
3. three-phase grid-connected power converter to perform current shaping, and
4. single-phase full bridge VSI to perform voltage generation.

Examples of these power converters are given below.

Figure 1:
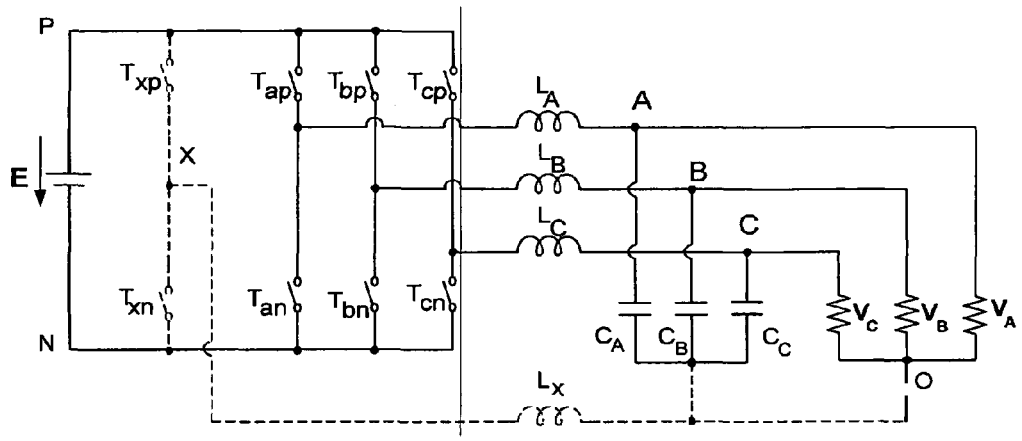
FIG. 1 shows a three-phase four-wire Voltage Source Inventor (VSI) and a three-phase three-wire VSI (without dashed lines) for voltage generation.
Figure 4:
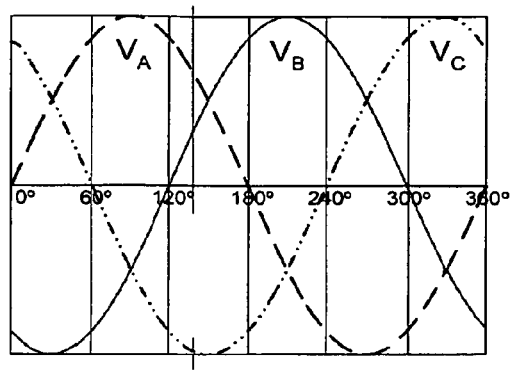
FIG. 4 shows an example of three-phase AC voltages.

FIG. 1 shows an example of a three-phase four-wire VSI commonly used for three-phase voltage generation such as in Uninterruptible Power Supply (UPS) systems and motor drives. The three-phase VSI converts a DC source into three-phase AC voltages. The VSI comprises switches $T_{ap}$-$T_{xn}$ and filters made up of inductors $L_A$-$L_X$ and capacitors $C_A$-$C_C$ interfacing the DC source to three-phase AC loads. The VSI can generated three-phase AC voltages, as depicted in FIG. 4, by operating the switches according to gate-trigger signals from a controller that determines the duty-ratios of the switches.

When the elements depicted in the dashed lines (i.e., the neutral phase switches $T_{xp}$ and $T_{xn}$, neutral inductor $L_X$ and the connection between the load neutral point and the capacitor neutral point) are removed, the VSI in FIG. 1 (with solid lines only) represents a three-phase three-wire VSI for voltage generation. The three-phase three-wire VSI is suitable for balanced three-phase loads, while the three-phase four-wire VSI can handle unbalanced loads.

Figure 2:
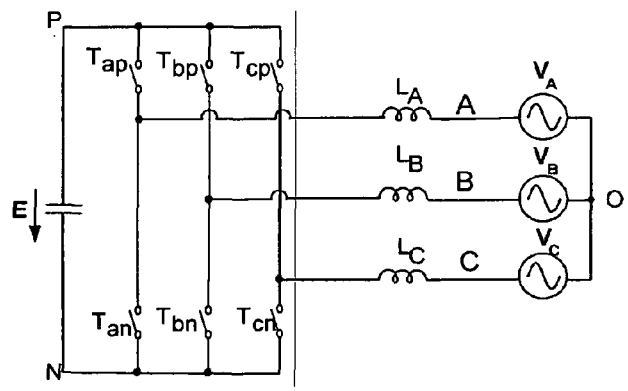
FIG. 2 shows a three-phase VSI for grid-connected power conversion with current shaping.

FIG. 2 shows an example of a three-phase power converter commonly used for grid-connected power conversion such as in a power factor correction rectifier, active power filter, inverter, or VAR generator. The power converter comprises six switches $T_{ap}$-$T_{cn}$ and three inductors $L_A$-$L_C$ interfacing a DC bus E with three-phase AC sources. The currents flowing through the inductors can be shaped by operating the switches according to the gate-trigger signals from a controller that determines the duty-ratios of the switches.

Figure 3:
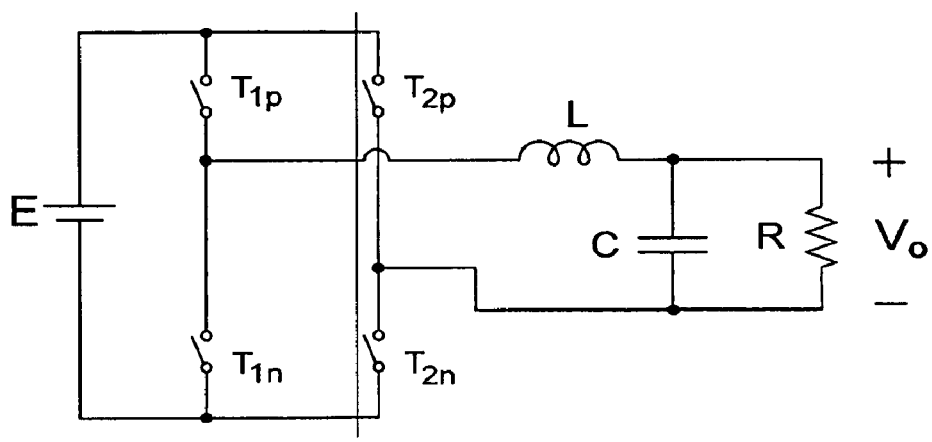
FIG. 3 shows a single-phase full bridge VSI for voltage generation.
Figure 5:
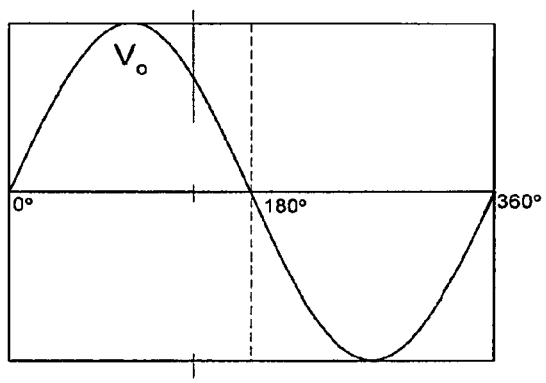
FIG. 5 shows an example of a single-phase AC voltage.

FIG. 3 shows an example of a single-phase full bridge VSI, which is a single-phase counterpart of the three-phase VSI in FIG. 1. The single-phase VSI comprises four switches $T_{1p} T_{2n}$ and one LC filter. The single-phase VSI is able to generate a single-phase sinusoidal voltage $V_o$, as shown in FIG. 5, for the load by operating the switches according to the gate-trigger signals from a controller that determines the duty-ratios of the switches.

The switches are typically implemented using semiconductor switches such as Metal Oxide Semiconductor Field Effect Transistors (MOSFETs), Insulated Gate Bipolar Transistor (IGBT)s, or Silicon Carbine (SIC) switches with anti-parallel diode. Two switches in the same leg operate in a complementary fashion. For example, the switches $T_{ap}$ and $T_{an}$ in FIG. 1 are in the same leg and operate in a complementary fashion. When switch $T_{ap}$ in open, switch $T_{an}$ is closed and vise versa.

Figure 6:
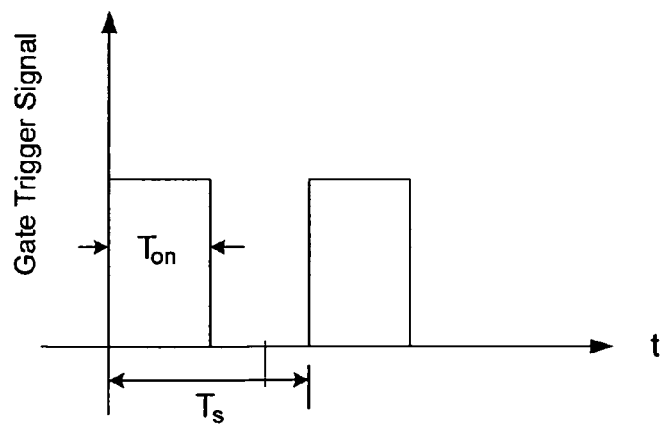
FIG. 6 shows an example of a time diagram for a gate-trigger signal.

FIG. 6 shows an example of a time diagram for a gate-trigger signal to a semiconductor switch. The switch is on when the gate-trigger signal is high and is off otherwise. The switch can operate at a switching frequency of, e.g., several KHz to several hundred KHz. As shown in FIG. 6, the gate-trigger signal is high for a time of $T_{on}$ over one switching period $T_s$. The duty ratio of the switch is the time $T_{on}$ that the switch is on over one switching period $T_s$.

The three-phase AV voltages shown in FIG. 4 represent voltage references for the expected AV voltages generated for the circuit in FIG. 1 or the AC source voltages for the circuit in FIG. 2. In FIG. 4, the three AC voltages are offset by 120° and may have a frequency of, e.g., 60 Hz. The single-phase voltage shown in FIG. 5 represents the voltage reference for the expected voltage generated to power the load for the circuit in FIG. 3.

In FIG. 4, one line period can be divided into six regions according to the zero crossing points of the AC voltages. For example, FIG. 4 shows one line period divided into six regions, each region spanning 60°. In FIG. 5, one line period can be divided into two regions according to the zero crossing points of the single phase AC voltage. For example, FIG. 5 shows one line period divided into two regions 0°-180° and 180°-360°.

Figure 7:
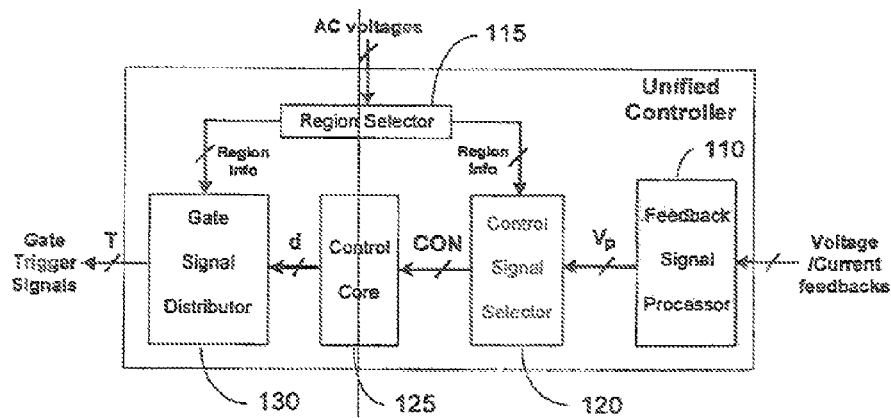
FIG. 7 shows a block diagram of a unified controller according to an embodiment of the invention.

FIG. 7 shows a unified controller to control voltage generation and grid-connected power conversion with current shaping according to a preferred embodiment of the invention. The unified controller comprises a feedback signal processor 110, a region selector 115, a control signal selector 120, a control core 125, and a gate signal distributor 130. The feedback signal processor processes 110 the feedback voltage and/or current signals from the power converter and sends the results (represented by $V_p$) to the control signal selector 120. The region selector 115 determines the active working region by detecting the zero crossing points of the power converter's AC voltages as shown in FIG. 4 or 5. The region selector 115 outputs the active region information to the control signal selector 120 and the gate signal distributor 130. The control selector 120 selects the active control signals (represented by CON) from the outputs (represented by $V_p$) of the feedback signal processor 110 according to the active region information from the region selector 115. The selected control signals (represented by CON) are processed by the control core 125 to generate duty-ratio signals (represented by d). The gate signal distributor 130 distributes these duty-ratios signals to trigger the appropriate switches (represented by T) based on the active region information from the region selector 115.

Exemplary implementations for the components of the unified controller are given below.

Implementations of the Feedback Processor

There are many possible implementations for the feedback signal processor 110. The implementation depends, for example, on the whether the unified controller is used for three-phase voltage regulation for a three-phase voltage generator (shown in FIG. 1), three-phase current shaping for a grid-connected power converter (shown in FIG. 2), or single-phase voltage regulation for a single-phase voltage generator (shown in FIG. 3).

Figure 8:
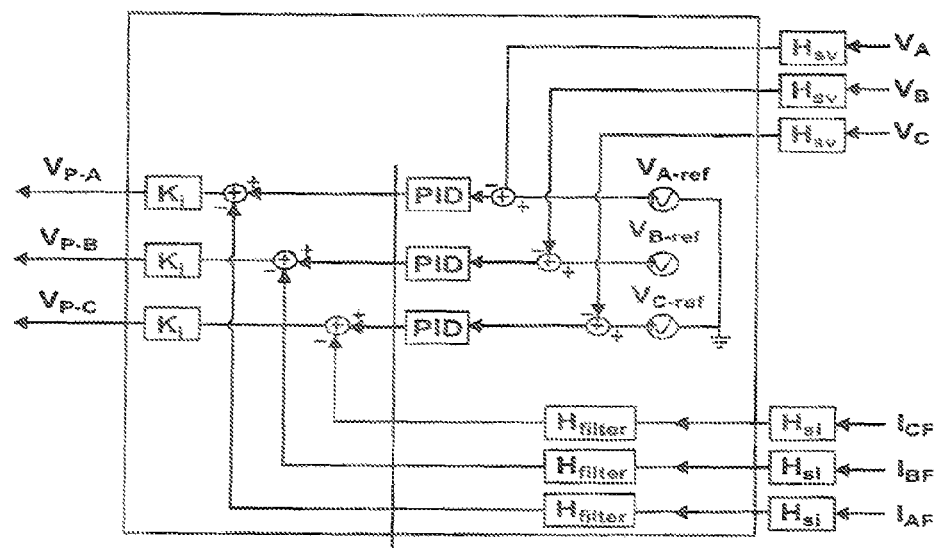
FIG. 8 shows a three-phase feedback processor for voltage regulation according to an embodiment of the invention.

FIG. 8 shows an exemplary implementation of the feedback signal processor 110 for voltage regulation for a three-phase voltage generator (shown in FIG. 1). In this implementation, the three-phase output voltages $V_A$, $V_B$ and $V_C$ of the three-phase voltage generator are sensed with a gain $H_{sv}$ and compared with three-phase voltage references $V_{A\text{-}ref}$, $V_{B\text{-}ref}$, $V_{C\text{-}ref}$. Their differences are fed to three PID compensators. The outputs of the PID compensators are subtracted by sensed currents $I_{AF}$-$I_{CF}$ multiplied by a sensing ratio $H_{si}$ and a transfer function of $H_{filter}$. The resulting signals are amplified by ratio $K_i$ to construct voltages $V_{p\text{-}A}$, $V_{p\text{-}B}$ and $V_{p\text{-}C}$, which are outputted to the control signal selector 120.

The sensed currents $I_{AF}$-$I_{CF}$ can be zero, inductor currents $I_L$, capacitor currents $I_C$, or capacitor currents $I_C$ via high pass filter $H_{hpf}$ as listed in Table 1 below. Table 1 lists the different possible sensed currents for $I_{AF}$-$I_{CF}$ and the corresponding $H_{filter}$. As shown in Table 1, the sensed current $I_{AF}$-$I_{CF}$ can be sensed from inductor currents $I_{LA}$-$I_{LC}$ in the inductors $L_A$-$L_C$ or sensed form the capacitor currents $I_{CA}$-$I_{CC}$ in the capacitors $C_A$-$C_C$ of the three-phase voltage generator (as shown in FIG. 1). The currents can be sensed with resistors so that the sensed currents in the feedback signal processor are in the form of voltages proportional to the currents being sensed.

TABLE 1

Three-phase dual-loop compensator controller parameters

| | Parameters | | | |
|---|---|---|---|---|
| Controller | No current compensator | $I_L$ compensator | $I_C$ compensator | $I_C$ with high pass filter compensator |
| $I_{AF}$-$I_{CF}$ | 0 | $I_{LA}$-$I_{LC}$ | $I_{CA}$-$I_{CC}$ | $I_{CA}$-$I_{CC}$ |
| $H_{filter}$ | 0 | 1 | 1 | $H_{hpf}$ |

Figure 9:
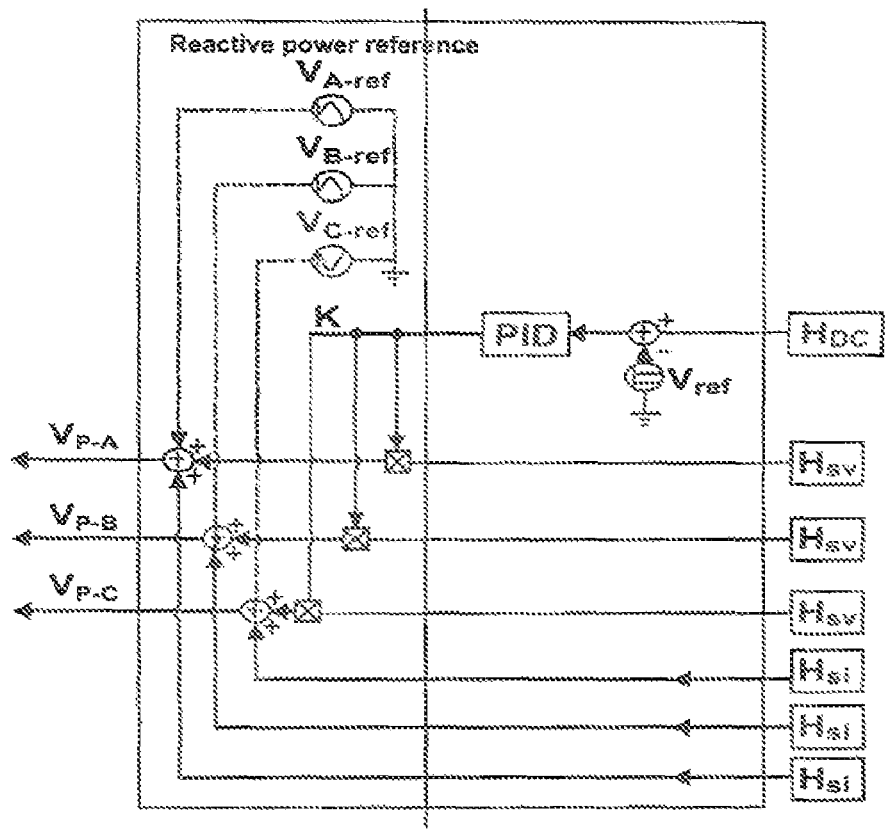
FIG. 9 shows a three-phase feedback processor for current shaping according to an embodiment of the invention.

FIG. 9 shows an exemplary implementation of the feedback signal processor 110 for current shaping for a grid-connected power converter (shown in FIG. 2). In this implementation, the DC bus voltage E is sensed with a ratio of $H_{DC}$ and compared with reference voltage $V_{ref}$. Their difference is processed by a PID compensator to keep the DC bus voltage constant. The PID compensator output is multiplied with the three-phase AC voltages (as shown in FIG. 4) sensed with a gain of $H_{sv}$. The resulting signals are summed with sensed inductor currents $I_{LA}$, $I_{LB}$ and $I_{LC}$ multiplied by a sensing ratio $H_{si}$ to construct voltages $V_{p-A}$, $V_{pB}$ and $V_{p-C}$, which are outputted to the control signal selector. The reactive power references, which are 90° leading or lagging the AC voltages, are added to $V_{p-A}$, $V_{p-B}$ and $V_{p-C}$ for VAR generation (as shown in dashed lines). When the amplitude of the reactive power references is zero, the power source currents have no VAR.

Figure 10:
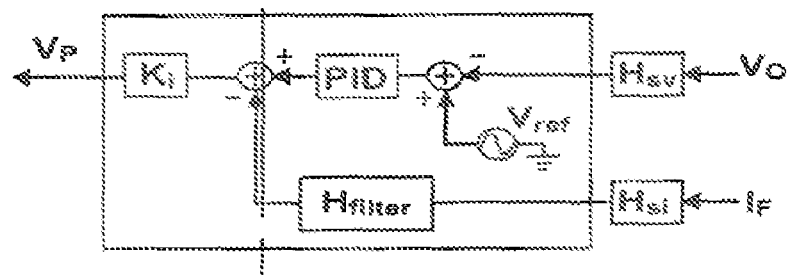
FIG. 10 shows a single-phase feedback processor for voltage regulation according to an embodiment of the invention.

FIG. 10 shows an exemplary implementation of the feedback signal processor 110 for voltage regulation for a signal-phase voltage generator (as shown in FIG. 3). In this implementation, the voltage $V_o$ is sensed with a ratio of $H_{DC}$ and compared with reference voltage $V_{ref}$. Their difference is processed by a PID compensator. The PD compensator output is subtracted by sensed current $I_F$ multiplied by a sensing ratio $H_{si}$ and a transfer function of $H_{filter}$. The resulting signal is amplified by ratio $K_i$ to construct voltage $V_p$, which is outputted to the control signal selector 120.

The sensed current $I_F$ can be zero, the inductor current $I_L$, the capacitor current $I_C$, or the capacitor current $I_C$ via high pass filter $H_{hpf}$ as listed in Table 2 below.

TABLE 2

Single-phase dual-loop compensator controller parameters

| | Parameters | | | |
|---|---|---|---|---|
| Controller | No current compensator | $I_L$ compensator | $I_C$ compensator | $I_C$ with high pass filter compensator |
| $I_F$ | 0 | $I_L$ | $I_C$ | $I_C$ |
| $H_{filter}$ | 0 | 1 | 1 | $H_{hpf}$ |

Implementations of the Control Signal Selector and Gate Signal Distributor

The control signal selector 120 and the gate signal distributor 130 may be implemented as pure logic circuits. The control signal selector 120 selects active phase voltages and sends them to the control core 125, while the gate signal distributor distributes duty-ratio signals from the control core 125 to the appropriate switches. The logics for the control of the three-phase power converters shown in FIGS. 1 and 2) are listed in Table 3 and the logics for the control of the single-phase power converter (shown in FIG. 3) are listed in Table 4.

In Table 3, active control signals $CON_p$, $CON_n$, $CON_x$ are selected by the control signal selector 120 from $V_{p-A}$, $V_{p-B}$ and $V_{p-C}$ from the feedback signal processor 110. Symbol $V_{p-AB}$ represents $V_{p-A}$ minus $V_{p-B}$ with the same notation method applying to $V_{p-AC}$, $V_{p-BC}$, and etc. Symbols $d_p$, $d_n$, and $d_x$ are duty-ratio signals from the control core 125 that are distributed by the date signal distributor 130 to the appropriate switches $T_{ap}$-$T_{xn}$ of the power converters shown in FIGS. 1 and 2. Symbol $d_t$ is a duty-ratio signal that is kept on for the entire region. The selection logics for $CON_x$ and $d_x$ are needed only for the three-phase four-wire VSI in FIG. 1.

TABLE 3

Logics for three-phase control signal selector and gate signal distributor

| Regions | $CON_p$ | $CON_n$ | $CON_x$ | $d_p$ | $d_n$ | $d_t = 1$ | $d_x$ |
|---|---|---|---|---|---|---|---|
| I: 0°-60° | $V_{p-AB}$ | $V_{p-CB}$ | $-V_{p-B}$ | $T_{an}$ | $T_{cn}$ | $T_{bn}$ | $T_{xn}$ |
| II: 60°-120° | $V_{p-AB}$ | $V_{p-AC}$ | $V_{p-A}$ | $T_{bp}$ | $T_{cp}$ | $T_{ap}$ | $T_{xp}$ |
| III: 120°-180° | $V_{p-BC}$ | $V_{p-AC}$ | $-V_{p-C}$ | $T_{bn}$ | $T_{an}$ | $T_{cn}$ | $T_{xn}$ |
| IV: 180°-240° | $V_{p-BC}$ | $V_{p-BA}$ | $V_{p-B}$ | $T_{cp}$ | $T_{ap}$ | $T_{bp}$ | $T_{xp}$ |
| V: 240°-300° | $V_{p-CA}$ | $V_{p-BA}$ | $-V_{p-A}$ | $T_{cn}$ | $T_{bn}$ | $T_{an}$ | $T_{xn}$ |
| VI: 300°-360° | $V_{p-CA}$ | $V_{p-CB}$ | $V_{p-C}$ | $T_{ap}$ | $T_{bp}$ | $T_{cp}$ | $T_{xp}$ |

For example, in region 0°-60°, the active control signals $CON_p$, $CON_n$, $CON_x$ are $V_{p-AB}$, $V_{p-CB}$ and $-V_{p-B}$, respectively. Duty-ratio signals $d_p$, $d_n$, and $d_x$ are distributed to switches $T_{an}$, $T_{cn}$, and $T_{xn}$, respectively and switch $T_{bn}$ is kept on for the entire region. Since the other switches $T_{ap}$, $T_{cp}$, $T_{xn}$, and $T_{bp}$ operate in a complementary fashion to switches $T_{an}$, $T_{cn}$, $T_{xn}$, and $T_{bn}$, respectively, their duty ratios are also defined by Table 3. The duty-ratios signals provide the gate trigger signals for semiconductor switches.

In Table 4, CON is the output of the control signal selector 120 and $V_p$ is the output of the feedback signal processor 110. In this case, $V_p$ is always selected as CON. Symbol $d_p$ is the duty-ratio signal that is distributed by the gate signal distributor 130 to the switches $T_{1p}$ or $T_{1n}$ of the power converter shown in FIG. 3. Symbol $d_t$ is the duty-ratio of the switch that is kept on for the entire region.

TABLE 4

Logics for single-phase control signal selector and gate signal distributor

| Regions | CON | $d_p$ | $d_t = 1$ |
|---|---|---|---|
| I: 0°~180° | $V_p$ | $T_{1p}$ | $T_{2n}$ |
| II: 180°~360° | $V_p$ | $T_{1n}$ | $T_{2p}$ |

Implementations of the Control Core

Figure 11:
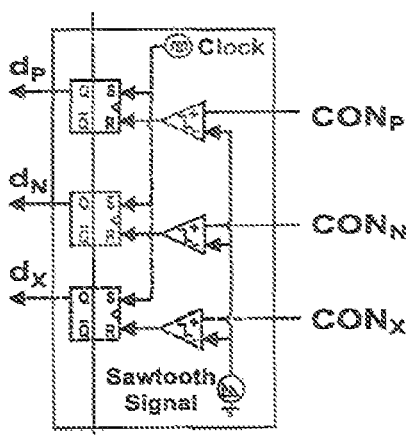
FIG. 11 shows a three-phase Pulse Width Modulator (PWM) control core according to an embodiment of the invention.
Figure 12:
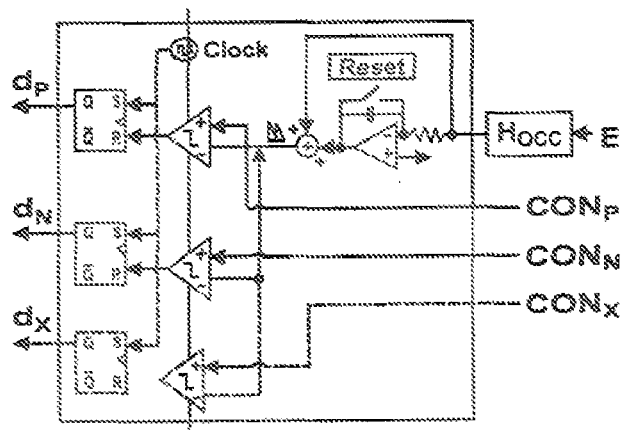
FIG. 12 shows a three-phase One Cycle Controller (OCC) control core according to an embodiment of the invention.
Figure 13:
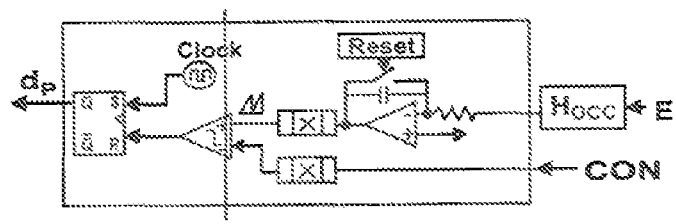
FIG. 13 shows a single-phase OCC control core according to an embodiment of the invention.

Almost all DC-DC controllers can be adapted for the control core. FIGS. 11 and 12 show two exemplary implementations of the control core 120 for the three-phase power converters (shown in FIGS. 1 and 2). FIG. 13 shows an exemplary implementation of the control core for the single-phase power converter (shown in FIG. 3).

FIG. 11 shows the three-phase control core implementation with Pulse Width Modulator (PWM). In the PWM implementation, the control core 125 comprises three SR flip-flops and three comparators. The duty-ratio signals $d_p$, $d_n$, and $d_x$ are generated at the Q terminals of the three flip-flops. The flip-flops are set through the S terminals by a clock signal at the beginning of each switching cycle, and are reset through the R terminals by the outputs of the three comparators, which are the compared results of the control signal selector outputs $CON_p$, $CON_n$, and $CON_x$ and a saw-tooth signal. The clock signal operates at the switching frequency, which can be a few kHz to hundreds of kHz.

At the beginning of each switching cycle, the clock signal sets the Q terminals of the flip-flops high through the S terminals and the saw-tooth signal begins to rise. At each comparator, when the saw-tooth crosses the respective CON signal, the comparator resets the Q terminal of the respective flip-flop low.

FIG. 12 shows the three-phase control core implementation with One Cycle Controller (OCC). In the OCC implementation, the source voltage E is sensed by a ratio $H_{occ}$ and fed to an integrator comprising a capacitor, a resistor and an amplifier. The integrator has a time constant equal to the switching period and is reset at the end of every switching period. The integrated result is summed with the sensed source voltage E to form a saw-tooth like waveform, whose slope is related to the source voltage E. The resulting saw-tooth like waveform is then compared with outputs $CON_p$, $CON_n$, and $CON_x$ from the control selector 120 to generate duty-ratio signals $d_p$, $d_n$, and $d_x$ in a manner similar to that of the PWM control core in FIG. 11. For both the PWM and OCC implementations, the dashed lines are only enabled for the three-phase four-wire VSI.

FIG. 9 shows the single-phase control core implementation with OCC. In this implementation, the duty-ratio signal $d_p$ is generated at the Q terminal of the flip-flop. The flip-flop is set through the S terminal by the clock signal at the beginning of each switching cycle, so the duty-ratio signal $d_p$ at the Q terminal is high. The flip-flop is reset through the R terminal by the output of the comparator, which is the result of comparing the absolute values of the control signal selector output CON and the integrator output. After reset, the duty-ratio signal $d_p$ at the Q terminal drops to low. The absolute value extractor represented by |X| is needed for both signals before any comparison. The integrator integrates the source voltage E sensed with a ratio of Hocc from the beginning of each switching cycle and is reset at the end of each switching period. The resistor and capacitor of the integrator are set to have a time constant equal to the switching period. Therefore, the integrated result is a saw-tooth like waveform with source voltage E information.

The PWM and OCC implementations of the control core provided above are exemplary only as many other implementations may be used for the control core.

Advantages and Applications

The unified control method described herein is universal and relatively simple. It can provide general control of three-phase voltage generation for both three-wire and four-wire circuits, three-phase current shaping, and single-phase voltage generation. The implementations of the unified controller are relatively simple requiring no DSP and no microprocessor.

Exemplary applications of the unified control method include:

1. Voltage generation for Uninterruptible Power Supply (UPS) systems, including three-phase three-wire systems, three-phase four-wire systems and single-phase systems.

a. three-phase four-wire voltage generation

The unified controller shown in FIG. 7 can control the VSI shown in FIG. 1 to perform voltage generation for three-phase four-wire UPS systems. The unified controller for this application can be implemented by having the control signal selector and the gate signal distributor follow the logics in Table 3, employing either the three-phase PWM (FIG. 11) or the three-phase OCC (FIG. 12) as the control core and employing the voltage regulator (FIG. 8) as the feedback signal processor.

b. three-phase three-wire voltage generation

The implementation for this application is similar to the previous one. The only difference is that the parts depicted in dashed lines in the VSI (FIG. 1) and the control cores (FIGS. 11 and 12) are removed and the logics for $CON_x$ and $d_x$ in Table 3 are disabled.

c. single-phase voltage generation

The unified controller shown in FIG. 7 can control the VSI shown in FIG. 3 to act as voltage generating inverter for single-phase UPS systems. The unified controller for this application can be implemented by having the control signal selector and the gate signal distributor follow the logics in Table 4, employing a single-phase OCC (FIG. 13) as the control core and using the voltage regulator (FIG. 10) as the feedback signal processor.

2. Power Factor Correction (PFC) rectifier with the load connected to the DC bus, in which the AC source voltages and currents are in phase.

3. Active Power Filter (APF) connected in parallel with the three-phase loads. In this case, the AC source voltages and currents are in phase as well.

4. Grid Connected Inverter (GCI), in which the AC source voltages and currents are in the opposite directions.

5. Bidirectional AC/DC converter used as the front end of a motor drive to perform Regenerative Braking (RB), in which the current can flow from the source or to the source depending on the motor operation status.

6. VAR generation, in which the source currents are 90° leading or lagging the AC voltages.

The implementation of the unified controller for applications 2-6 can be the same, with the power converter shown in FIG. 2. The control signal selector and gate signal distributor follow the logics in Table 3, either three-phase PWM (depicted in FIG. 11 with solid line only) or three-phase OCC (depicted in FIG. 12 with solid line only) are employed as the control core, and the three-phase current shaper (FIG. 9) is used. Reactive power references in the current shaping feedback signal processor are only needed for VAR generation (application 6).

Figure 14:
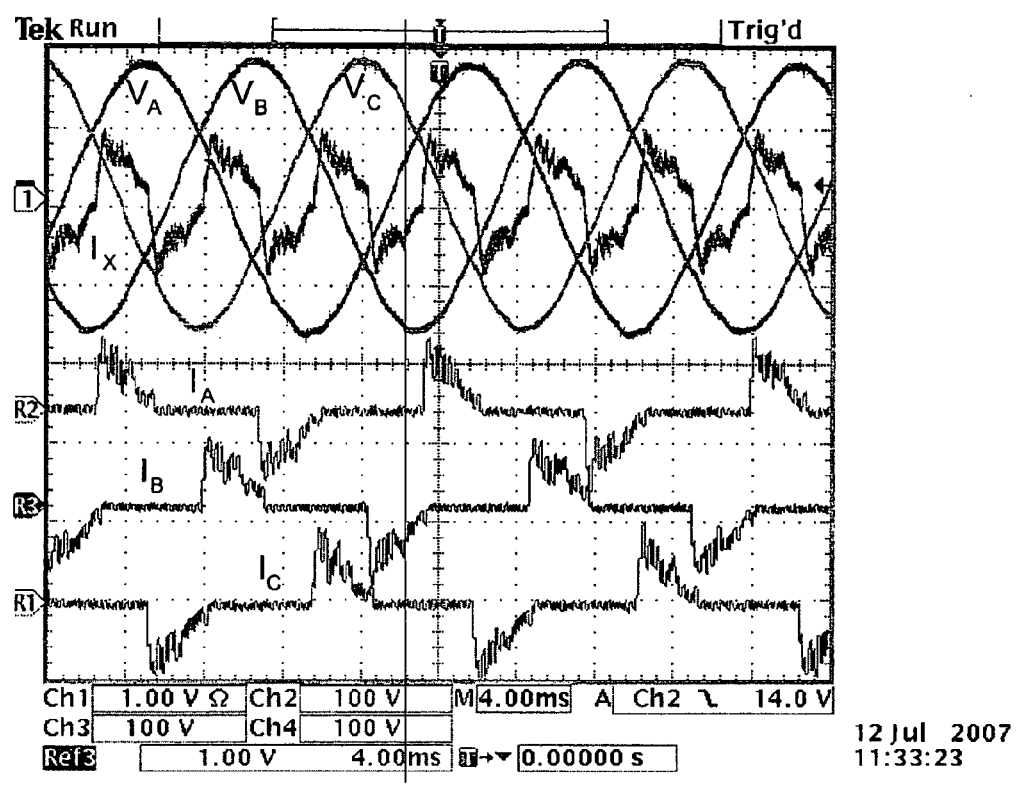
FIG. 14 shows experimental results of a three-phase four-wire VSI with three-single phase non-linear loads.

Prototypes were built and experiments were conducted to demonstrate all the exemplary applications list above. Exemplary experimental results were measured from the three-phase four-wire VSI prototype. FIG. 14 shows the waveforms tested under three single-phase non-linear loads. It is evident that three-phase output voltages ($V_A$, $V_B$ and $V_C$) stay in high quality when the three-phase currents $I_A$, $I_B$ and $I_C$ are highly distorted. Despite the challenging loading conditions, the three-phase output voltages $V_A$, $V_B$ and $V_C$ are still in high quality.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A controller for a power converter, comprising:
   a feedback signal processor configured to generate a plurality of intermediate signals based on a plurality of feedback signals from the power converter;
   a region selector configured to detect different regions of each cycle of the power converter, and output region information indicating a current region of the power converter;
   a control signal selector configured to generate a plurality of control signals, wherein, for each control signal, the control signal selector selects at least one of the intermediate signals according to the region information from the region selector;
   a control core configured to receive the plurality of control signals and generate a plurality of duty-ratio signals based on the received control signals; and a signal distributor configured to distribute the plurality of duty-ratio signals to switches in the power converter according to the region information from the region selector.

2. The controller of claim 1, wherein, for each control signal, the control signal selector selects the at least one intermediate signal by following a logic table in accordance with the region information from the region selector.

3. The controller of claim 1, wherein the signal distributor distributes the plurality of duty-ratio signals by following a logic table in accordance with the region information from the region selector.

4. The controller of claim 1, wherein the region selector is configured to detect the different regions based on zero crossing points of a plurality of alternating current (AC) voltage signals of the power converter.

5. The controller of claim 1, wherein the different regions comprises six regions, each region spanning 60° of a single cycle of the power converter.

6. The controller of claim 1, wherein the plurality of duty-ratio signals have a switching frequency of one KHz to 10 MHz.

7. The controller of claim 1, wherein the control core is configured as a one cycle controller (OCC) or a pulse width modulator (PWM).

8. The controller of claim 1, wherein the feedback signals comprise sensed voltage signals from the power converter.

9. The controller of claim 8, wherein the feedback signal processor is configured to compare the sensed voltage signals with reference voltage signals, and generate the intermediate signals based at least partially on the comparisons.

10. The controller of claim 9, wherein the reference voltages signals comprise alternating current (AC) voltage signals.

11. The controller of claim 9, wherein the feedback signal processor is configured to generate difference signals based on differences between the sensed voltage signals and the reference voltage signals, input the difference signals to a plurality of PID compensators, and subtract a plurality of sensed currents from the outputs of the PID compensators to generate the intermediate signals.

12. The controller of claim 11, wherein the sensed currents are sensed from currents flowing through inductors or capacitors in the power converter.

13. The controller of claim 1, wherein the power converter is a three-phase three-wire power converter or a three-phase four-wire power converter.

14. The controller of claim 1, wherein the feedback signal processor is configured to generate a difference signal based on a difference between a sensed direct current (DC) voltage and a reference voltage, input the difference signal to a PID compensator, multiply the output of the PID compensator with sensed voltages from the power converter, and sum the results of the multiplication with sensed currents from the power converter to generate the intermediate signals.

15. The controller of claim 14, wherein the sensed currents are sensed from currents flowing through inductors in the power converter.

16. The controller of claim 15, wherein the power converter comprises a grid-connector three-phase power converter.

* * * * *